US008734885B2

(12) United States Patent
Sweeney (10) Patent No.: US 8,734,885 B2
(45) Date of Patent: May 27, 2014

(54) COLD INFUSION PROCESS FOR FORTIFYING COFFEE BEANS

(75) Inventor: Michael Sweeney, Houston, TX (US)

(73) Assignee: Voyava Republic LLC, Woodside, CA (US)

( * ) Notice: Subject to any disclaimer, the term of this patent is extended or adjusted under 35 U.S.C. 154(b) by 430 days.

(21) Appl. No.: 11/770,484

(22) Filed: Jun. 28, 2007

(65) Prior Publication Data

US 2008/0008781 A1    Jan. 10, 2008

Related U.S. Application Data

(60) Provisional application No. 60/806,082, filed on Jun. 28, 2006, provisional application No. 60/820,454, filed on Jul. 26, 2006, provisional application No. 60/820,448, filed on Jul. 26, 2006.

(51) Int. Cl.
*A23F 5/04* (2006.01)
*A23F 5/10* (2006.01)

(52) U.S. Cl.
USPC ............................ 426/595; 426/594; 426/465

(58) Field of Classification Search
CPC .............. A23F 5/14; A23F 5/04; A23L 1/30
USPC ............... 426/72, 73, 93, 309, 311, 595, 629, 426/648, 656, 658, 61, 331, 442, 534, 594, 426/69, 71, 74
See application file for complete search history.

(56) References Cited

U.S. PATENT DOCUMENTS

| 2,508,477 A | 5/1950 | Stievater et al. |
| 2,831,770 A | 4/1958 | Antoshkiw |
| 4,006,255 A | 2/1977 | Gralak |
| 4,097,613 A | 6/1978 | DeLauder et al. |
| 4,316,916 A * | 2/1982 | Adamer ........................ 426/329 |
| 4,985,271 A * | 1/1991 | Neilson et al. ................ 426/595 |
| 5,160,757 A | 11/1992 | Kirkpatrick et al. |
| 5,322,857 A | 6/1994 | Chou |
| 5,853,787 A | 12/1998 | Gurol |

(Continued)

FOREIGN PATENT DOCUMENTS

| AU | 2007200100 A1 | 2/2007 |
| EP | 0282762 A | 9/1988 |

(Continued)

OTHER PUBLICATIONS

Translation of EP 0282762 (1988).*

(Continued)

*Primary Examiner* — Rena Dye
*Assistant Examiner* — Lela S Williams
(74) *Attorney, Agent, or Firm* — Mayer Brown LLP (57) ABSTRACT

This invention relates to a cold infusion process for fortifying coffee beans with one or more vitamin, non-vitamin, mineral, non-mineral, botanical, hormone, herb, neutraceutical, lipid, carbohydrate, amino acid, acid, salt, prebiotic, or probiotic functional additives. This invention also discloses an infused coffee bean produced by the process of infusing the coffee bean at a temperature of less than about 120° F. with a solution comprising water, a bridge initiator for acid salt bias, fortifying agent(s), and an acid in a quantity sufficient to reach a pH of about 3.65. Further, this invention provides a method for the infusion of a coffee bean with at least one fortifying agent at approximately room temperature.

6 Claims, 3 Drawing Sheets

(56) References Cited

U.S. PATENT DOCUMENTS

| | | | |
|---|---|---|---|
| 5,894,027 | A | 4/1999 | Kazemzadeh |
| 6,039,996 | A | 3/2000 | Hornack |
| 6,045,843 | A | 4/2000 | Gurol |
| 6,102,213 | A | 8/2000 | Gurol |
| 6,207,203 | B1 | 3/2001 | Adkinson et al. |
| 6,660,322 | B2 | 12/2003 | Zapp et al. |
| 6,669,979 | B1 | 12/2003 | Zhao et al. |
| 6,723,368 | B1 | 4/2004 | Zapp et al. |
| 7,220,440 | B2 | 5/2007 | Dria et al. |
| 7,740,878 | B2 | 6/2010 | Craig |
| 2001/0008645 | A1 | 7/2001 | Hansa et al. |
| 2002/0076477 | A1 | 6/2002 | Hansa et al. |
| 2003/0091615 | A1* | 5/2003 | Craig .............. 424/439 |
| 2003/0108645 | A1 | 6/2003 | Armand et al. |
| 2005/0031761 | A1 | 2/2005 | Brucker et al. |
| 2005/0126398 | A1 | 6/2005 | Ascaso Lopez |
| 2005/0163907 | A1 | 7/2005 | Young et al. |
| 2005/0271777 | A1* | 12/2005 | Orsini .............. 426/281 |
| 2006/0051461 | A1 | 3/2006 | Antonio et al. |
| 2008/0299283 | A1 | 12/2008 | Penson et al. |
| 2009/0220645 | A1 | 9/2009 | Martinez et al. |

FOREIGN PATENT DOCUMENTS

| | | | |
|---|---|---|---|
| EP | 0 478 859 | * | 12/1990 |
| EP | 1284103 | A | 2/2003 |
| GB | 1328608 | | 8/1973 |
| WO | 96/14757 | | 5/1996 |
| WO | 97/18720 | | 5/1997 |

OTHER PUBLICATIONS

Elmhurst College, Virtual Chembook, 2003.*
Clarke, et al., "Coffee vol. 1 Chemistry", pp. 271-281 (1987).
Fast, et al., "Breakfast Cereals and How They are Made", pp. 195-220 (1990).
International Search Report, PCT/US2007/072384, Feb. 22, 2008.
International Search Report, PCT/US2007/074511, Jul. 22, 2008.
Farah, et al., "Effect of Roasting on the Formation of Chlorogenic Acid Lactones in Coffee," J. Agric. Food Chem., 53:1505-1513 (2005).
Leloup, et al., "Degradation Mechanisms of Chlorogenic Acids During Roasting," AISC, 16th Colloquium, Kyoto, 192-198 (1995).
Liu and Kitts, "Confirmation that the Maillard Reaction is the Principle Contributor to the Antioxidant Capacity of Coffee Brews." Food Research International, Accepted Manuscript, 1-34 (2011) doi: 10.1016/j.foodres.2010.12.037.
Martins, et al., "A Review of Maillard Reaction in Food and Implications to Kinetic Modelling," Trends in Food Science & Technology, 11:364-373 (2001).
Perren, et al., "Recent Developments in Coffee Roasting Technology," ASIC 2004. 20th International Conference on Coffee Science, Bangalore, India, Oct. 11-15, 2004, pp. 451-459.
Wei et al. "Roasting Process of Coffee Beans as Studied by Nuclear Magnetic Resonance: Time Course of Changes in Composition," J. Agric. Food Chem., vol. 60, pp. 1005-1012, 2012.
Ciampa et al. "Studies on Coffee Roasting Process by Means of Nuclear Magnetic Resonance Spectroscopy," Journal of Food Quality, vol. 33, pp. 199-211, 2010.

* cited by examiner

COLD INFUSION PROCESS FOR FORTIFYING COFFEE BEANS

RELATED CASES

This application claims priority to U.S. Provisional Application Ser. No. 60/806,082 filed Jun. 28, 2006, and to U.S. Provisional Application Ser. Nos. 60/820,454 and 60/820,448 filed on Jul. 26, 2006, the entire contents of which are hereby incorporated by reference herein.

TECHNICAL FIELD

This disclosure relates to a cold infusion process for fortifying coffee beans, corn, and/or soy beans. In addition, this disclosure relates to methods of making and manufacturing coffee products utilizing the cold infusion process, as well as coffee formulations created using the cold infusion process. Further, the disclosure relates to infused coffee beans that can be used for coffee concentrate, flavored coffee and/or coffee confection.

BACKGROUND

According to the Food and Drug Administration, most Americans consume too many calories and not enough nutrients. Moreover, most Americans do not eat balanced meals and their daily staples do not provide them with the health benefits they need. This problem, however, does not just affect Americans. Rather, vitamin and mineral deficiencies are a problem for people throughout the world.

There are several strategies that work to prevent and control vitamin and mineral deficiencies. These strategies are 1.) supplementation (e.g., ingesting tablets or capsules of vitamins and/or minerals); 2.) dietary modification (e.g., increasing consumption of micronutrient-rich foods); 3.) public health measures (e.g., controlling infections and/or improving water and sanitation); and 4.) fortification (e.g., adding vitamins and/or minerals to commonly consumed staples).

These four strategies are well known, and many countries have adopted public health programs that are aimed at implementing these strategies. However, fortification of one's daily staples is the most advantageous strategy as it can efficiently and cost-effectively deliver vitamins and minerals to large volumes of people without requiring those people to change their dietary habits. Yet, very few daily staples are fortified with vitamins and/or minerals. Thus, there is a need for a product, such as a daily staple, that provides additional health and wellness benefits to people throughout the world.

SUMMARY OF THE INVENTION

The disclosure provides a cold infusion process for fortifying coffee beans, corn, or soy beans with one or more vitamin, non-vitamin, mineral, non-mineral, botanical, hormone, herb, neutraceutical, lipid, carbohydrate, amino acid, acid, salt, prebiotic, or probiotic functional additives.

This disclosure also provides for an infused coffee bean, corn, or soy bean produced by the process of infusing the coffee bean, corn, or soy bean at a temperature of less than about 120° F. with a solution comprising water, a bridge initiator for acid salt bias, fortifying agent(s), and an acid in a quantity sufficient to reach a pH of about 3.65.

This disclosure further relates to a method for the infusion of a coffee bean with at least one fortifying agent comprising the steps of roasting the coffee bean; allowing the coffee bean to cool to approximately room temperature; preparing a fortifying solution comprising at least one fortifying agent, a bridge initiator for acid salt bias, an acid, and water; and mixing the roasted coffee bean with the fortifying solution.

This disclosure also relates to a method for the infusion of a coffee bean with at least one flavoring agent comprising the steps of roasting the coffee bean; allowing the coffee bean to cool to approximately room temperature; preparing a flavoring solution comprising at least one flavoring agent, a bridge initiator for acid salt bias, an acid, and water; and mixing the roasted coffee bean with the flavoring solution.

The details of one or more embodiments of the disclosure are set forth in the description below. Other features, objects, and advantages of the disclosure will be apparent from the description and from the claims.

DETAILED DESCRIPTION

While the present invention is capable of being embodied in various forms, the description below of several embodiments is made with the understanding that the present disclosure is to be considered as an exemplification of the invention, and is not intended to limit the invention to the specific embodiments illustrated. Headings are provided for convenience only and are not to be construed to limit the invention in any way. Embodiments illustrated under any heading may be combined with embodiments illustrated under any other heading.

The use of numerical values in the various ranges specified in this application, unless expressly indicated otherwise, are stated as approximations as though the minimum and maximum values within the stated ranges were both preceded by the word "about." In this manner, slight variations above and below the stated ranges can be used to achieve substantially the same results as values within the ranges. As used herein, the terms "about" and "approximately" when referring to a numerical value shall have their plain and ordinary meanings to one skilled in the art of chemistry, food science, or the art relevant to the range or element at issue. The amount of broadening from the strict numerical boundary depends upon many factors. For example, some of the factors to be considered may include the criticality of the element and/or the effect a given amount of variation will have on the performance of the claimed subject matter, as well as other considerations known to those of skill in the art. Thus, as a general matter, "about" or "approximately" broaden the numerical value. For example, in some cases, "about" or "approximately" may mean ±5%, or ±10%, or ±20%, or ±30% depending on the relevant technology. Also, the disclosure of ranges is intended as a continuous range including every value between the minimum and maximum values recited.

It is to be understood that any ranges, ratios, and ranges of ratios that can be formed by any of the numbers or data present herein represent further embodiments of the present invention. This includes ranges that can be formed that do or do not include a finite upper and/or lower boundary. Accordingly, the skilled person will appreciate that such ratios, ranges and values are unambiguously derivable from the data presented herein.

As used herein, the term "coffee" includes, but is not limited to, both caffeinated and decaffeinated coffee.

As used herein, the term "bean" or "coffee bean" includes, but is not limited to, both whole coffee beans, broken coffee beans, ground coffee beans, and/or pieces of coffee beans.

As used herein, the term "infuse" or "infusion" includes, but is not limited to, to force, imbue, penetrate, pour, introduce, steep, soak, instill, ingrain, inject, impregnate, charge, fill, and/or introduce a solid, liquid, or gas into a space or substance. "Space," as used herein, includes, but is not limited to, a cavity, compartment, interstice, opening, and/or an extent or expanse of a surface or three-dimensional area. "Substance," as used herein, is any physical, molecular, cellular, or atomic structure or form.

As used herein, the term "a bridge initiator for acid salt bias" includes, but is not limited to, any compound that can be used as both an acid and/or a base, such as betaine and certain complex oxidizing agents such as $ClO_2$ and $H_2ClO_3$.

As used herein, the term "fortifying agent" shall mean a vitamin, non-vitamin, mineral, non-mineral, botanical, hormone, herb, neutraceutical, lipid, carbohydrate, amino acid, acid, salt, prebiotic, or probiotic. Similarly, "fortifying agents" shall mean one or more vitamins, non-vitamins, minerals, non-minerals, botanicals, hormones, herbs, neutraceuticals, lipids, carbohydrates, amino acids, acids, salts, prebiotics, and/or probiotics. Moreover, "fortifying agent(s)" shall include hydrous and anhydrous forms of vitamin(s), non-vitamin(s), mineral(s), non-mineral(s), botanical(s), hormone(s), herb(s), neutraceutical(s), lipid(s), carbohydrate(s), amino acid(s), acid(s), salt(s), prebiotic(s), and/or probiotic(s).

For example, fortifying agents for use in the methods, processes, and formulations of the prevent invention include, but are not limited to, vitamins, minerals, proteins, methylsulfonyl-methane ("MSM"), green tea and green tea extract, white tea and white tea extract, chondroitin sulfate, dimethylaminoethanol ("DMAE"), alphalipoic acid, lutien, white willow bark, ginger, amino acids, chromium picolinate, melatonin, and vanadium. Non-vitamin, non-mineral additives include, for example, neutraceuticals that are not considered vitamins, and neutraceuticals that are not considered minerals. For example, a non-vitamin, non-mineral functional additive includes, without limitation, amino acids, MSM, inositol, green tea and green tea extract, DMAE, alphalipoic acid, lutien preparations, white willow bark preparations, ginger preparations, colostrum, a phytosterol (e.g., beta-sitosterol), a phytostanol, passion flower preparations, ginseng preparations, sarsaparilla preparations, bayberry root preparations, echinacea powder, burdock root preparations, goldenseal root preparations, kelp preparations, hyssop preparations, milk thistle preparations, astragalus preparations, black-currant oil, cordyceps preparations, quercetin (a flavonoid), stinging nettle preparations, and tumeric preparations.

Non-limiting examples of vitamins include, for example, niacin, thiamin, folic acid, pantothenic acid, biotin, vitamin A, vitamin C, vitamin B (e.g., vitamin B.sub.2, vitamin B.sub.3, vitamin B6, vitamin B.sub.12), vitamin D, vitamin E, and vitamin K.

Non-limiting examples of minerals include, for example, iron, calcium, magnesium, zinc, iodine, iron, copper, phosphorous, chromium, molybdenum, and fluoride. Non-limiting examples of minerals also include any salt of the mineral, for example, magnesium citrate, magnesium gluconate, magnesium sulfate, zinc chloride, zinc sulfate, potassium iodide, chromium nicotinate, chromium picolinate, copper sulfate, copper gluconate, and copper citrate. Moreover, forms of calcium include amino acid chelated calcium, calcium carbonate, calcium oxide, calcium hydroxide, calcium sulfate, calcium chloride, calcium phosphate, calcium hydrogen phosphate, calcium dihydrogen phosphate, calcium citrate, calcium malate, calcium titrate, calcium gluconate, calcium realate, calcium tantrate, calcium lactate, and calcium citrate-malate. Iron includes ferric iron, ferric salts, ferrous iron, and ferrous salts.

"Herbs," as used herein, refers to substances derived from plants and plant parts, such as leaves, flowers, seeds, roots, and herbal extracts without limitation. Herbs for use in the present invention include agrimony, alfalfa, aloe vera, amaranth, angelica, anise, barberry, basil, bayberry, bee pollen, birch, bistort, blackberry, black cohosh, black walnut, blessed thistle, blue cohosh, blue vervain, boneset, borage, buchu, buckthorn, bugleweed, burdock, capsicum, cayenne, caraway, cascara sagrada, catnip, celery, centaury, chamomile, chaparral, chickweed, chicory, chinchona, cloves, coltsfoot, comfrey, cornsilk, couch grass, cramp bark, culver's root, cyani, cornflower, damiana, dandelion, devils claw, dong quai, echinacea, elecampane, ephedra, eucalyptus, evening primrose, eyebright, false unicorn, fennel, fenugreek, figwort, flaxseed, guarana, garlic, gentian, ginger, ginkgo, ginseng, golden seal, gotu kola, gum weed, hawthorn, hops, horehound, horseradish, horsetail, hoshouwu, hydrangea, hyssop, iceland moss, irish moss, jojoba, juniper, kelp, lady's slipper, lemon grass, licorice, lobelia, mandrake, marigold, marjoram, marshmallow, mistletoe, mullein, mustard, myrrh, nettle, oatstraw, oregon grape, papaya, parsley, passion flower, peach, pennyroyal, peppermint, periwinkle, plantain, pleurisy root, pokeweed, prickly ash, psyllium, quassia, queen of the meadow, red clover, red raspberry, redmond clay, rhubarb, rose hips, rosemary, rue, safflower, saffron, sage, St. John's wort, sarsaparilla, sassafras, saw palmetto, scullcap, senega, senna, shepherd's purse, slippery elm, spearmint, spikenard, squawvine, stillingia, strawberry, taheebo, thyme, uva ursi, valerian, violet, watercress, white oak bark, white pine bark, wild cherry, wild lettuce, wild yam, willow, wintergreen, witch hazel, wood betony, wormwood, yarrow, yellow dock, yerba santa, yucca and combinations thereof.

As used herein, "neutraceuticals" includes a blend of fortifying agents, including, but not limited to, vitamin(s), non-vitamin(s), mineral(s), non-mineral(s), botanical(s), hormone(s), herb(s), neutraceutical(s), lipid(s), carbohydrate(s), amino acid(s), acid(s), salt(s), prebiotic(s), and/or probiotic(s) that is designed to deliver a benefit to a human or an animal when administered.

Under one embodiment of the present invention, the process of infusing fortifying agents into coffee beans comprises the following steps. First, coffee beans are selected. Brazilian, Colombian, Ethiopian, Mexican, and/or Nicaraguan coffee beans are preferred; however, any coffee bean may be used. For example, additional coffee beans that can be utilized under the present invention include, but are not limited to, Costa Rican, Kona, and Guatemalan. Further, blends of different coffee beans may be used. For example, a Brazilian and Colombian blend of coffee beans, or an Ethiopian and Nicaraguan blend of coffee beans, may be used.

Once selected, the green coffee beans are roasted by methods standard in the industry. In fact, various roasting equipment and processes well known in the art may be employed. The coffee beans are slowly roasted for approximately 10-minutes. In one embodiment, the coffee beans are roasted for approximately 13 minutes. During the roasting period, moisture trapped inside the coffee beans turns to steam. This conversion of water to steam breaks the internal cellular structure of the coffee beans and causes the beans to swell and produce a sound known as the "first crack." As the roasting process proceeds, the coffee beans continue to increase in volume. The coffee beans are roasted to the point at which the beans have increased in volume, but before the beans experience the "second crack." The "second crack" is the physical fracturing of the coffee beans' cellular matrix. At this point, the coffee beans have completed the roasting process.

The coffee beans are then removed from the roasting equipment and allowed to cool. In one embodiment, the coffee beans are allowed to cool for 24 hours. In yet another embodiment, the coffee beans are allowed to cool for 12 hours. In yet another embodiment, the coffee beans are allowed to cool until they reach room temperature.

In another embodiment, the coffee beans are roasted with a process that will maintain the structure of the endosperms of the coffee beans. Specifically, the roasting process ("RP") utilizes heat to transform the chemical and physical properties of green coffee beans into roasted coffee products suitable for fortification and human and/or animal consumption. The roasters used in this RP typically operate at temperatures between approximately 188° C. and 282° C., (370° C. and 540° F.).

The RP of the present invention varies by the type and the nature of the coffee beans, but is a process that nurtures the development and the evolution of the endosperm of the coffee bean. The RP includes the following six stages.

The drying cycle is the first stage of the RP, when the temperature of the coffee beans rises to 100° C. During this first stage, the coffee beans change from a bright green color to a pale yellow color. This stage is carried out slowly and expands the coffee beans gently to allow for a more even cooking throughout the coffee beans.

The second stage of the RP is the first crack. When the coffee beans reach 160° C., complex chemical reactions, which are well known in the art, begin to occur, causing a cracking sound.

The third stage of the RP is the roast initiation. The coffee beans swell to 140-160% of their initial size. Carbohydrates, and specifically sugars, within the coffee beans begin to caramelize, leaving the coffee beans their characteristic brown color. The roasting of the coffee beans is then slowed, and as a result of the slow roasting, the coffee beans produce a fully developed flavor profile. The endosperm of the coffee beans remain completely intact at the conclusion of this phase of the RP. As a result, the endosperm is maximally expanded for the quality and selection of the green coffee bean. The expansion of the coffee bean's endosperm offers the opportunity for fortification at a later point in time.

The fourth stage of the RP is the pause. In this stage, the audible cracking ceases, but the chemical reactions continue. The length of time of this silence will depend on the amount of heat applied by the roaster. Gentle application of heat, or for some green coffee types, even lowering the heat can continue the RP to a dark roast without reaching the second crack.

The fifth stage of the RP is the second crack. The progressive dehydration of the coffee beans has made them brittle. As a result, cracking can be heard. It is at this stage that elements in the coffee bean begin to carbonize, producing the burnt characteristics of extremely dark roasts. When the beginning of this phase occurs, the coffee beans are removed from the roaster and the process is ended. The coffee beans are removed from the roaster at this point in the RP as further roasting breaks the endosperms of the coffee beans and can limit available bonding sites for fortification at a later point in time.

The sixth stage of the RP is stopping the roast. Once the optimal amount of roasting time has elapsed, the coffee beans must be quickly cooled. The cooling of the coffee beans is usually accomplished by introducing large amounts of cool air or water to the beans. Both the introduction of cool air or the introduction of water are acceptable methods for stopping the RP.

Figure 1:
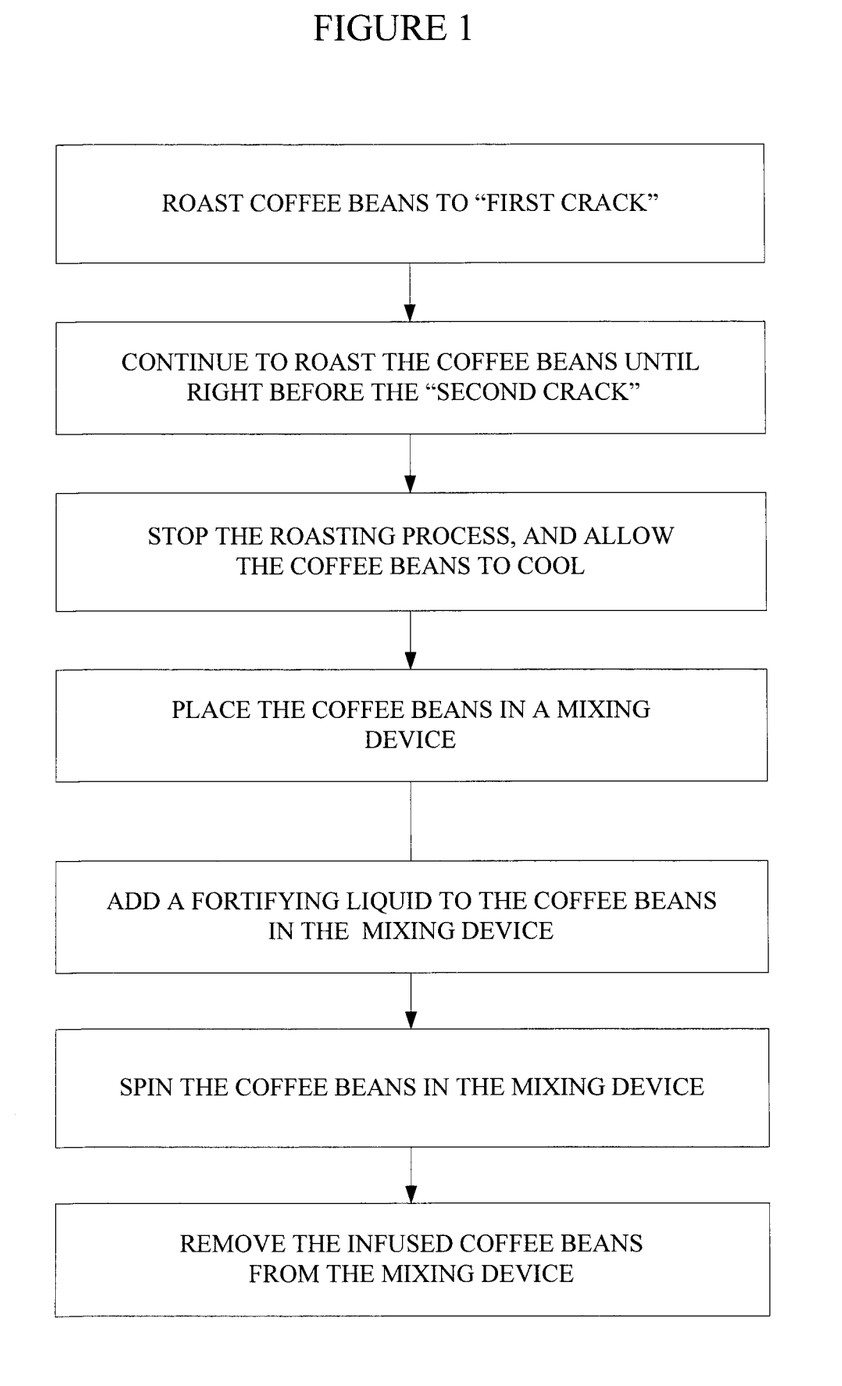
FIG. 1 is a flow chart that depicts the steps of a cold infusion process for fortifying coffee beans.
Figure 2:
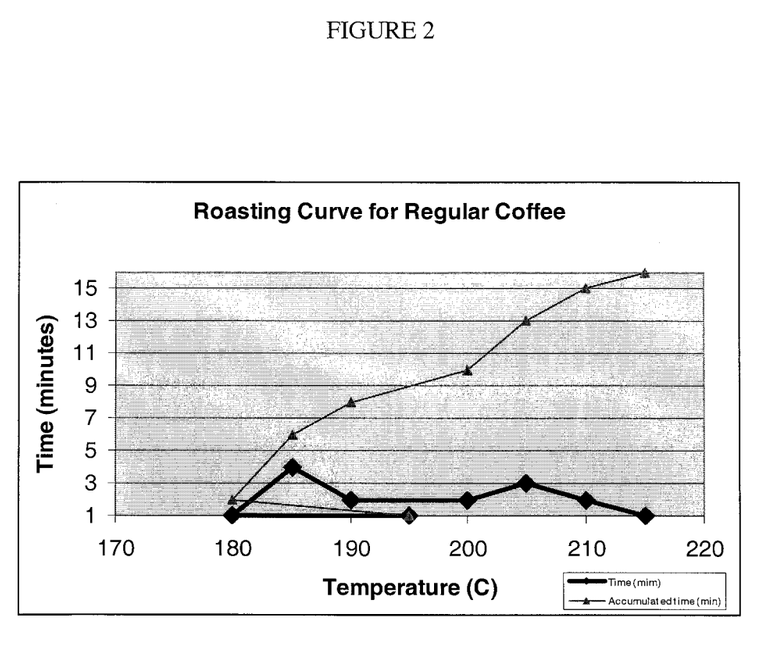
FIG. 2 is a line graph that depicts the roasting curve for caffeinated coffee.

Table One below is a representative roasting curve for a caffeinated coffee bean and provides for 1.) the temperature at each stage of the RP, 2.) the length of time of each roasting stage of the RP, and 3.) the total roasting time for the coffee bean. (See also Figure Two).

TABLE ONE

| Temperature (° C.) | Time of Each Roasting Stage (min.) | Accumulated Time (min.) |
| --- | --- | --- |
| 195 | 1 | 1 |
| 180 | 1 | 2 |
| 185 | 4 | 6 |
| 190 | 2 | 8 |
| 200 | 2 | 10 |
| 205 | 3 | 13 |
| 210 | 2 | 15 |
| 215 | 1 | 16 |

Figure 3:
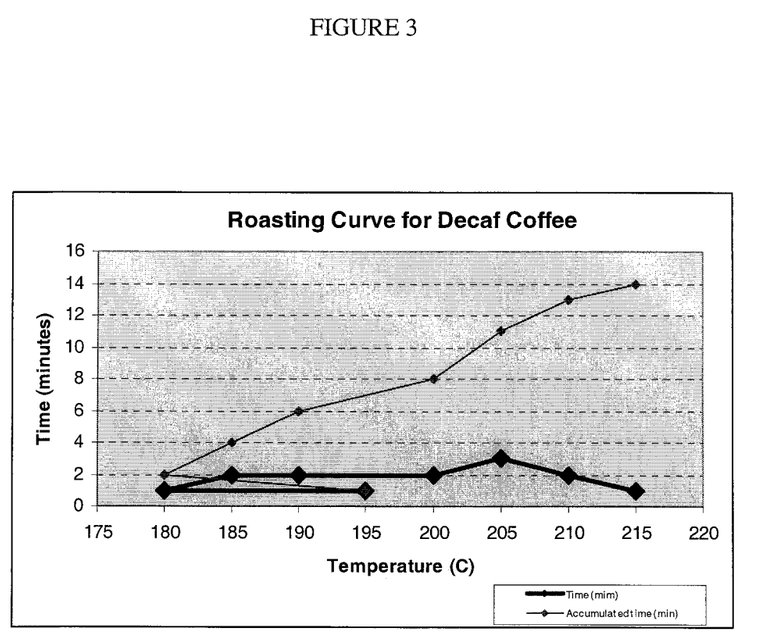
FIG. 3 is a line graph that depicts the roasting curve for decaffeinated coffee.

Table Two below is a representative roasting curve for a decaffeinated coffee bean and provides for 1.) the temperature at each stage of the RP, 2.) the length of time of each roasting stage of the RP, and 3.) the total roasting time for the coffee bean. (See also Figure Three).

TABLE TWO

| Temperature (° C.) | Time of Each Roasting Stage (min.) | Accumulated Time (min.) |
| --- | --- | --- |
| 195 | 1 | 1 |
| 180 | 1 | 2 |
| 185 | 2 | 4 |
| 190 | 2 | 6 |
| 200 | 2 | 8 |
| 205 | 3 | 11 |
| 210 | 2 | 13 |
| 215 | 1 | 14 |

Once the beans have cooled, they are placed in a mixing device. In one embodiment, the mixing device is a rotating drum. In another embodiment, the mixing device is an electric mixer. In yet another embodiment, the mixing device is a tumbler. Under the present invention, one mixing device can hold approximately 1-1000 lbs. of coffee beans, approximately 5-500 lbs. of coffee beans, or approximately 25-200 lbs. of coffee beans.

To the mixing device containing the coffee beans, a solution containing fortifying agents is added. In one embodiment, the solution comprises water, a bridge initiator for acid salt bias, an acid, and fortifying agent(s). In still another embodiment, the solution comprises deionized water, betaine, citric acid, and fortifying agent(s).

The water used in the present invention may be deionized water, purified water, ultra-purified water, distilled water, tap water, or bottled water. In an embodiment, the solution comprises about 1000-5000 g of water, about 2000-4000 g of water, or about 3500-4000 g of water per gallon of solution.

In an embodiment of the present invention, the solution comprises greater than 0 g to about 3000 g of fortifying agent(s), about 100-2000 g of fortifying agent(s), or about 150-1500 g of fortifying agent(s) per gallon of solution.

In one embodiment of the present invention, the solution comprises greater than 0 g to about 200 g of a bridge initiator for acid salt bias, about 50-150 g of a bridge initiator for acid salt bias, or about 80-110 g of a bridge initiator for acid salt bias per gallon of solution.

In another embodiment, honey is also added to the solution. In still another embodiment, a mixture of honey, vanilla, apple, and/or orange is added to the solution. In addition, the solution may comprise greater than 0 g to about 500 g of the mixture of honey, vanilla, apple, and/or orange, about 200-400 g of the mixture of honey, vanilla, apple, and/or orange, or about 250-350 of the mixture of honey, vanilla, apple, and/or orange per gallon of solution.

In one embodiment, the acid used in the present invention includes any food-grade acid. In another embodiment, the acid used is citric acid, ascorbic acid, or phosphoric acid. In one embodiment, the solution comprises an acid in a quantity sufficient ("qs") to yield the desired pH. Further, the solution of the present invention has an acidic pH. For example, the solution may have a pH of about 5.5, 5.45, 5.4, 5.35, 5.3, 5.25, 5.2. 5.15, 5.1, 5.05, 5.0, 4.95, 4.9, 4.85, 4.8, 4.75, 4.7, 4.65, 4.6, 4.55, 4.5, 4.45, 4.4, 4.35, 4.3, 4.25, 4.2, 4.15, 4.1, 4.05, 4.0, 3.95, 3.9, 3.85, 3.8, 3.75, 3.7, 3.65, 3.6, 3.55, 3.5, 3.45, 3.4, 3.35, 3.3, 3.25, 3.2, 3.15, 3.1, 3.05, 3.0, 2.95, 2.9, 2.85, 2.8, 2.75, 2.7, 2.65, 2.6, 2.55, 2.5, 2.45, 2.4, 2.35, 2.3, 2.25, 2.2, 2.15, 2.1, 2.05, 2.0, 1.95, 1.9, 1.85, 1.8, 1.75, 1.7, 1.65, 1.6, 1.55, 1.5, 1.45, 1.4, 1.35, 1.3, 1.25, 1.2, 1.15, 1.1, 1.05, or 1.0. In one embodiment, the solution has a pH of less than about 5. In still another embodiment, the solution has a pH of less than about 4. In another embodiment, the solution has a pH of about 3.85. In yet another embodiment, the solution has a pH of about 3.65. In a further embodiment, the solution has a pH of between about 4 and about 3.5. In one embodiment, the solution is heated to a temperature of less than or equal to approximately 250° F., 225° F., 200° F., 175° F., 150° F., or 125° F. before it is added to the coffee beans in the mixing device. In yet another embodiment, the solution is heated to a temperature of less than approximately 120° F. before it is added to the coffee beans in the mixing device. In still another embodiment, the solution is heated to a temperature of between approximately 75° F. to 95° F. In another embodiment, the solution is heated to a temperature of approximately 90° F. In still another embodiment, the solution is heated to room temperature. In a further embodiment, the solution is heated to a temperature that allows all of the fortifying agent(s) to dissolve into the solution. In still another embodiment, the solution is not heated before it is added to the coffee beans in the mixing device.

The solution of the present invention does not require the addition of a preservative, such as polypropylene glycol ("PPG"), to prevent the growth of microorganisms. However, the solution of the present invention can contain a preservative, such as PPG, to prevent the growth of microorganisms.

Once the solution is added to the coffee beans, it is mixed with the coffee beans until all of the solution is absorbed into the beans. In one embodiment, the coffee beans are mixed for approximately 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1 minutes. In a further embodiment, the coffee beans are mixed for approximately 5-30 minutes. In another embodiment, the coffee beans are mixed for approximately 8-12 minutes. In still another embodiment, the coffee beans are mixed for approximately 5-10 minutes.

Under the present invention, the coffee beans appear "wet" immediately after contact with the solution in the mixing device. However, as the mixing device mixes the coffee beans with the solution, the beans appear to dry. This is because the solution has been infused into the coffee beans.

In one embodiment of the present invention, approximately 100%, 95%, 90%, 85%, 80%, 75%, 70%, 65%, 60%, 55%, 50%, 45%, 40%, 35%, 30%, 25%, 20%, 15%, 10%, 9%, 8%, 7%, 6%, 5%, 4%, 3%, 2%, or 1% of the solution has been infused into the coffee bean. In still another embodiment, approximately 100% of the solution has been infused into the coffee bean. In another embodiment, more than approximately 90% of the solution has been infused into the coffee bean. In still another embodiment, more than approximately 80% of the solution has been infused into the coffee bean. In yet another embodiment, more than approximately 70% of the solution has been infused into the coffee bean.

In a further embodiment of the present invention, approximately 100%, 95%, 90%, 85%, 80%, 75%, 70%, 65%, 60%, 55%, 50%, 45%, 40%, 35%, 30%, 25%, 20%, 15%, 10%, 9%, 8%, 7%, 6%, 5%, 4%, 3%, 2%, or 1% of the solution has adhered or been affixed to the outer skin of the coffee bean. In still another embodiment, approximately 50% of the solution has adhered or been affixed to the outer skin of the coffee bean. In another embodiment, less than approximately 40% of the solution has adhered or been affixed to the outer skin of the coffee bean. In still another embodiment, less than approximately 30% of the solution has adhered or been affixed to the outer skin of the coffee bean. In yet another embodiment, less than approximately 20% of the solution has adhered or been affixed to the outer skin of the coffee bean. In a further embodiment, less than approximately 10% of the solution has adhered or been affixed to the outer skin of the coffee bean.

The infusion of fortifying agents into the coffee bean occurs because the fortifying agents bind to the endosperm of the roasted coffee bean at room temperature. Specifically, the fortification is accomplished by creating acid linkages to the cellulose in the endosperm of the coffee bean. The endosperm of the coffee bean comprises a collection of acid linkages by means of the natural evolution of acids in well-grown coffee beans from around the world. Properly roasting the coffee beans and essentially exposing more of these available binding sites avails the coffee bean to the continuing bonding of acid species to the cellulose. Utilizing this phenomena to bind fortifying agents is, in essence, natural fortification of coffee.

Under one embodiment of the present invention, the fortifying agent(s) are infused to the endosperm of the coffee bean. In another embodiment of the present invention, the fortifying agent(s) are infused between the space between the endosperm and the pectin. In another embodiment of the present invention, the fortifying agent(s) are infused on the skin of the coffee bean. In still another embodiment, the fortifying agent(s) are infused 1.) to the endosperm of the coffee bean; 2.) between the space between the endosperm and the pectin; and/or 3.) on the skin of the coffee bean.

Under one embodiment of the present invention, a compound is required that can act as both an acid and/or a base in the unique area that is undergoing binding in the endosperm. In one embodiment, betaine is used to act as both an acid and/or a base. However, any compound with the ability to act as both an acid and/or a base may be employed. These compounds, such as betaine, move between the di-methyl and tri-methyl form in the coffee bean's complex organic system. As the endosperm of a coffee bean contains more than 30 acids, the endosperm has a very wide pKA range which offers binding flexibility to the betaine. The mechanism of this is not well understood, but it is also known that certain complex oxidizing agents such as $ClO_2$ and $H_2ClO_3$ are compounds that can exhibit both acid and/or base characteristics in certain organic reaction zones, under varied pHs.

Since this mechanism moves fortifying agents into place and binds them to the endosperm of the coffee bean using acid salt bridges, virtually all water-soluble ingredients that have an acid form and the capability to be reverted to an ionic form can be placed in the endosperm using this invention.

In one embodiment of the present invention, the binding of the fortifying agents to the endosperm of the coffee bean does not create any interstitial water between the pectin and the endosperm and leaves only a modest moisture increase to the fortified coffee beans. The result is a fortified coffee bean that is well below the safe moisture content for a coffee bean, leaving the shelf life of the fortified coffee bean comparable to non-fortified coffee beans.

In another embodiment of the present invention, the binding of the fortifying agents to the endosperm of the coffee bean does create interstitial water between the pectin and the endosperm.

Once infused, the coffee beans can then be packaged. In one embodiment, the coffee beans are foil-wrapped and packaged with nitrogen, or vacuumed and nitrogen-flushed in stand-up valve bags, to ensure freshness for at least 12 months. In another embodiment, the coffee beans are foil-wrapped and packaged with nitrogen, or vacuumed and nitrogen-flushed in stand-up valve bags, to ensure freshness for at least 18 months. In yet another embodiment, the coffee beans are packaged in a manner that allows them to become stale within about two weeks from when they were packaged. In a further embodiment, the coffee beans are packaged in a manner that allows them to become stale within a few minutes, days, or weeks from when they were packaged.

In another embodiment, the infused coffee beans are ground before they are packaged using grinding methods known in the art.

The present invention provides for coffee beans containing fortifying agents of an amount of approximately 0.01% to approximately 10% by dry weight.

The coffee infused with fortifying agents under the present invention can be used, for example, to improve a subject's memory, increase mental alertness, reduce joint pain and/or inflammation, increase a subject's flexibility, reduce oxidative damage, reduce allergy symptoms, increase a subject's metabolism, improve weight loss and/or reduce weight gain, reduce pain (e.g., pain associated with inflammation), strengthen a subject's immune system response, reduce stomach upset, reduce motion sickness, improve energy and metabolism, promote smoking cessation, reduce stress, improve bone strength and density, and improve cholesterol levels (e.g., lower cholesterol). Further, coffee infused with fortifying agents under the present invention can be used by a subject to receive coffee's antimicrobial effects, antioxidant power, and positive impact on cognition and mood. Moreover, coffee infused with fortifying agents under the present invention can be used by a subject to decrease the incidence and/or effects of cardiovascular disease, asthma, bronchitis, diabetes, gastrointestinal diseases, liver cirrhosis, Parkinson's disease, and neurological conditions. Coffee infused with fortifying agents under the present invention can also be used by a subject to increase the subject's sexual activity. The disclosure provides certain formulations useful to affect a subject's health. However, other formulations will be readily apparent from the description and the agents described herein.

For one embodiment, the coffee beans infused with fortifying agents under the present invention maintain the physical structure of the coffee bean. In another embodiment of the present invention, the coffee beans infused with fortifying agents under the present invention do not maintain the physical structure of the coffee bean. In another embodiment of the present invention, the natural flavors and sugars of the coffee bean are preserved throughout the infusion process.

Under one embodiment of the present invention, the coffee beans are infused only with organic ingredients. Moreover, the infused coffee beans are certified organic by the United States Department of Agriculture, or other similar regulatory agencies throughout the world. In another embodiment, the coffee beans are infused with all-natural ingredients. In still another embodiment, the coffee beans are infused with partial-organic and/or partial-natural ingredients. In yet another embodiment, the coffee beans are infused with non-organic and/or non-natural ingredients.

Under another embodiment of the present invention, flavoring agents can be infused into the coffee beans. Specifically, the coffee beans can be infused with flavoring agents such as amaretto, apple, caramel, caramel creme, caramel nut, cinnamon, cinnamon nut, cinnamon crumb cake, hazelnut, Irish creme, vanilla, French vanilla, chocolate, chocolate macadamia, chocolate cherry, chocolate raspberry, chocolate mint, chocolate mocha, English toffee, egg nog, coconut, coconut rum, chocolate hazelnut, chocolate caramel, honey, mocha, orange, almond, kahlua, cherry, peach, strawberry, raspberry, blueberry, macadamia nut, pecan, pomegranate, peppermint, toasted marshmallow, butterscotch, or any derivation of natural or artificial flavor that can be solubilized. In another embodiment, the flavoring agents are sugar-free.

Under still another embodiment of the present invention, the coffee beans infused with fortifying agents can be coated with dark chocolate, milk chocolate, or white chocolate. The infused coffee beans can also be coated with a candy coating.

Under yet another embodiment of the present invention, the coffee beans infused with fortifying agents can be used to make coffee concentrate. The coffee concentrate made from the infused coffee beans can then be used, for example, in ready-to-drink beverages, ice creams, baked goods, energy drinks, energy bars, confectionary, cold coffee beverages, puddings, food preparations, and weight-loss shakes. In still another embodiment, the coffee beans infused with fortifying agents can be used to make coffee confection.

In one embodiment of the present invention, the moisture content of the coffee beans infused with fortifying agents and/or flavors is equal to or less than about 10%, 9%, 8%, 7%, 6%, 5%, 4%, 3%, 2%, or 1%. In a further embodiment of the present invention, the moisture content of the coffee beans infused with fortifying agents and/or flavors is equal to or less than about 10%. In another embodiment, the moisture content of the coffee beans infused with fortifying agents and/or flavors is equal to or less than about 5%. In still another embodiment, the moisture content of the coffee beans infused with fortifying agents and/or flavors is equal to or less than about 3%.

In another embodiment of the present invention, the coffee beans are decaffeinated before roasting. In one particular embodiment, the coffee beans are decaffeinated using a chemical-free process, such as the process marketed under the trade name, Swiss Water® process-based decaffeination. In another embodiment, the coffee beans are decaffeinated using any water-based decaffeination process that does not alter the binding ability of the endosperm of the coffee bean.

These and many other aspects of the invention will be fully apparent to one of ordinary skill in the art in view of the examples set forth below. The examples provided herein are illustrative and are not to be construed as limiting the invention in any manner.

EXAMPLE ONE

Coffee beans have been infused with fortifying agents to increase mental alertness and short-term memory.

Specifically, coffee beans were roasted for approximately 13 minutes. During the 13-minute roasting process, the coffee beans produced the first crack. However, the roasting process was ended before the coffee beans produced the second crack.

The coffee beans were then removed from the roasting equipment and allowed to cool overnight. Next, the cooled coffee beans were placed in a food-grade tumbler, typical of equipment used for flavored coffee preparation.

A solution containing fortifying agents was then prepared comprising the fortifying agents outlined below in Table Three.

TABLE THREE

| The "Clarity" Solution (one gallon) | |
| --- | --- |
| triple deionized water | 3786.5 g |
| betaine | 90.9 g |
| white tea | 785.7 g |
| ginkgo biloba | 630.5 g |
| custom flavoring | 287.8 g |
| citric acid | qs to pH of 3.65 |

Specifically, the solution containing the fortifying agents was made by placing the triple deionized water ("DIW") into a clean 5-gallon mixing vat ("MV").

The MV was placed on a warming griddle, and the temperature of the griddle was set to 325° F. A mixer was then placed in the MV and the speed set to 550 rpm to ensure uniform heating. Once the DIW reached a temperature of 110° F., the griddle was turned off. Next, the mixer speed was increased to 750 rpm. Once the mixer was up to speed, the ginkgo biloba was then added to the DIW. The solution was mixed for approximately 20 minutes.

White tea was then added to the solution and the mixing speed was increased to 1000 rpm. This step required the use of a Teflon® paddle to clean the sides of the MV and to break up clumps in the solution. The solution was mixed for about 20 minutes and then removed from the griddle.

Next, the pH of the solution was adjusted to about 3.65 with citric acid.

After a uniform solution was achieved, and the temperature decreased to below 95° F., betaine and custom flavoring were added to the solution and mixed for approximately 10 minutes. The speed of the mixer was then reduced to 800 rpm, and the mixing continued until the temperature reached approximately 90° F. The solution was then added to the coffee beans in the tumbler. The tumbler was started, and the solution and the coffee beans were mixed together for approximately 8 minutes. The beans were then removed from the tumbler. Finally, the coffee beans were packaged.

A 6 oz. cup of coffee brewed from the coffee beans infused with the clarity solution contains about 25 mg of white tea and about 20 mg of ginkgo biloba.

EXAMPLE TWO

Coffee beans have been infused with fortifying agents to help promote natural weight loss and increase the body's ability to burn calories.

Particularly, coffee beans were roasted for approximately 13 minutes. During the 13-minute roasting process, the coffee beans produced the first crack. However, the roasting process was ended before the coffee beans produced the second crack.

The coffee beans were then removed from the roasting equipment and allowed to cool overnight. Next, the cooled coffee beans were placed in a food-grade tumbler, typical of equipment used for flavored coffee preparation.

A solution containing fortifying agents was then prepared comprising the fortifying agents outlined below in Table Four.

TABLE FOUR

| The "Metabolism" Solution (one gallon) | |
| --- | --- |
| triple deionized water | 3786.5 g |
| betaine | 93.5 g |
| green tea extract | 655.1 g |
| guarana seed extract | 492.2 g |
| inositol | 331.3 g |
| chromium nicotinate (1% w/w soln.) | 168.5 g |
| custom flavoring | 246.1 g |
| citric acid | qs to pH of 3.65 |

Specifically, the solution containing the fortifying agents was made by first preparing a 1% w/w solution of chromium poly-nicotinate ("CP") by adding 200 mL of DIW in a glass beaker and adding 2 mg of CP to the DIW. This mixture was then placed on a magnetic stirrer and stirred for about 20 minutes at a speed setting of at least five (5), and a heat setting of at least one (1), until all the contents were completely solubilized in the DIW.

Next, the DIW was placed in a clean 5-gallon MV. The MV was then placed on a warming griddle, and the temperature of the griddle was set to 325° F. A mixer was placed in the MV and the speed set to 550 rpm to ensure uniform heating.

Once the DIW reached a temperature of 118° F. the griddle was turned off. The mixer speed was increased to 600 rpm, and once that speed was reached, the inositol was added to the DIW and mixed for approximately 10 minutes.

Next, the guarana extract was added to the mixture and the mixing speed was increased to 800 rpm. The solution was mixed for about 10 minutes, and then removed from the griddle.

Once the temperature of the solution was below 110° F., the green tea was added and the mixing speed was increased to 1100 rpm. The solution was then mixed for about 10 minutes.

Next, the CP was added, and the pH of the solution was adjusted to about 3.65 with citric acid. At that time, betaine and custom flavoring were added to the solution. The speed of the mixer was then reduced to 750 rpm, and the mixing continued until the temperature reached approximately 90° F. The solution was added to the coffee beans in the tumbler. The tumbler was started, and the solution and the coffee beans were mixed together for approximately 8 minutes. The beans were then removed from the tumbler. Finally, the coffee beans were packaged.

A 6 oz. cup of coffee brewed from the coffee beans infused with the metabolism solution contains about 20 mg of green tea extract, about 15 mg of guarana, about 10 mg of inositol, and about 50 mcg of chromium nicotinate.

EXAMPLE THREE

Coffee beans have been infused with fortifying agents to help strengthen the body's natural immune system and promote better overall wellness.

Specifically, coffee beans were roasted for approximately 13 minutes. During the 13-minute roasting process, the coffee beans produced the first crack. However, the roasting process was ended before the coffee beans produced the second crack.

The coffee beans were then removed from the roasting equipment and allowed to cool overnight. Next, the cooled coffee beans were placed in a food-grade tumbler, typical of equipment used for flavored coffee preparation.

A solution containing fortifying agents was then prepared comprising the fortifying agents outlined below in Table Five.

TABLE FIVE

The "Immunity" Solution (one gallon)

| triple deionized water | 3786.5 g |
|---|---|
| betaine | 97.7 g |
| echinacea | 1166.2 g |
| rosehips | 836.8 g |
| ginseng | 337.0 g |
| custom flavoring | 268.8 g |
| citric acid | qs to pH of 3.65 |

Particularly, the solution containing the fortifying agents was made by placing the DIW into a clean 5-gallon MV. The MV was then placed on a warming griddle, and the temperature of the griddle was set to 325° F. Next, a mixer was placed in the MV and the speed was set to 550 rpm to ensure uniform heating.

Once the DIW reached a temperature of 110° F., the griddle was turned off, and the mixer speed increased to 900 rpm. Rose hips were then added to the DIW and mixed for approximately 20 minutes.

Next, ginseng was added to the solution. The speed of the mixer was increased to 1100 rpm and the solution was mixed for 15 minutes. Echinacea was then added and mixed in thoroughly.

Next, the solution was removed from the griddle and the pH of the solution was adjusted to about 3.65 with citric acid.

After a uniform solution was achieved, and the temperature decreased to below 95° F., betaine and custom flavoring were added to the solution and mixed for approximately 10 minutes. The speed of the mixer was then reduced to 700 rpm, and the mixing continued until the temperature reached approximately 90° F. The solution was then added to the coffee beans in the tumbler. The tumbler was started, and the solution and the coffee beans were mixed together for approximately 8 minutes. The beans were then removed from the tumbler. Finally, the coffee beans were packaged.

A 6 oz. cup of coffee brewed from the coffee beans infused with the immunity solution contains about 35 mg of echinacea, about 25 mg of rosehips, and about 10 mg of ginseng.

EXAMPLE FOUR

Coffee beans have been infused with fortifying agents to help overall joint health in the body and allow for greater vitality.

Particularly, coffee beans were roasted for approximately 13 minutes. During the 13-minute roasting process, the coffee beans produced the first crack. However, the roasting process was ended before the coffee beans produced the second crack.

The coffee beans were then removed from the roasting equipment and allowed to cool overnight. Next, the cooled coffee beans were placed in a food-grade tumbler, typical of equipment used for flavored coffee preparation.

A solution containing fortifying agents was then prepared comprising the fortifying agents outlined below in Table Six.

TABLE SIX

The "Flexibility" Solution (one gallon)

| triple deionized water | 3786.5 g |
|---|---|
| betaine | 94.7 g |
| chondroitin sulfate | 973.1 g |
| MSM | 651.3 g |
| custom flavoring | 259.4 g |
| citric acid | qs to pH of 3.65 |

Specifically, the solution containing fortifying agents was made by placing the DIW into a clean 5-gallon MV. The MV was then placed on a warming griddle, and the temperature of the griddle was set to 325° F. Next, a mixer was placed in the MV and the speed was set to 550 rpm to ensure uniform heating.

Once the DIW reached a temperature of 120° F., the griddle was turned off and the mixer increased to 650 rpm. MSM was then added and mixed with the DIW for approximately 10 minutes.

Next, chondroitin sulfate was added. The mixing speed was increased to 900 rpm, and the solution was mixed for about 20 minutes.

The solution was then removed from the griddle and the pH of the solution was adjusted to about 3.65 with citric acid.

After a uniform solution was achieved, and the temperature decreased to below 95° F., betaine and custom flavoring were added to the solution and mixed for approximately 10 minutes. The speed of the mixer was then reduced to 700 rpm, and the mixing continued until the temperature reached approximately 90° F. The solution was then added to the coffee beans in the tumbler. The tumbler was started, and the solution and the coffee beans were mixed together for approximately 8 minutes. The beans were then removed from the tumbler. Finally, the coffee beans were packaged.

A 6 oz. cup of coffee brewed from the coffee beans infused with the flexibility solution contains about 30 mg of chondroitin sulfate and about 20 mg of MSM.

EXAMPLE FIVE

Coffee beans have been infused with fortifying agents to help reduce stress.

Particularly, coffee beans were roasted for approximately 13 minutes. During the 13-minute roasting process, the coffee beans produced the first crack. However, the roasting process was ended before the coffee beans produced the second crack.

The coffee beans were then removed from the roasting equipment and allowed to cool overnight. Next, the cooled coffee beans were placed in a food-grade tumbler, typical of equipment used for flavored coffee preparation.

A solution containing fortifying agents was then prepared comprising the fortifying agents outlined below in Table Seven.

TABLE SEVEN

The "Calm" Solution (one gallon)

| triple deionized water | 984.5 g |
|---|---|
| betaine | 15.8 g |
| passion flower 4:1 | 113.2 g |
| vitamin B6 | 1.3 g |
| custom flavoring | 37.9 g |
| inositol | 77.6 g |
| citric acid | qs to pH of 3.65 |

Specifically, the solution containing fortifying agents was made by placing the DIW into a clean 5-gallon MV. The MV was then placed on a warming griddle, and the temperature of the griddle was set to 325° F. Next, a mixer was placed in the MV and the speed was set to 550 rpm to ensure uniform heating.

Once the DIW reached a temperature of 118° F., the griddle was turned off. The mixing speed was increased to 700 rpm, and once that speed was obtained, the passion flower was added to the DIW. The solution was then mixed for approximately 20 minutes.

Next, the vitamin B6 was added and the solution was mixed for approximately 10 minutes. The inositol was then added and the mixing speed was increased to 800 rpm. The solution was then mixed for approximately 10 minutes.

The solution was then removed from the griddle and the pH of the solution was adjusted to about 3.65 with citric acid.

After a uniform solution was achieved, and the temperature decreased to below 95° F., betaine and custom flavoring were added to the solution and mixed for approximately 10 minutes. The speed of the mixer was then reduced to 600 rpm, and the mixing continued until the temperature reached approximately 90° F. The solution was then added to the coffee beans in the tumbler. The tumbler was started, and the solution and the coffee beans were mixed together for approximately 8 minutes. The beans were then removed from the tumbler. Finally, the coffee beans were packaged.

A 6 oz. cup of coffee brewed from the coffee beans infused with the calm solution contains about 15 mg of passion flower, about 150 mcg of vitamin B6, and about 10 mg of inositol.

EXAMPLE SIX

Coffee beans have been infused with fortifying agents to help increase a subject's daily intake of calcium.

Particularly, coffee beans were roasted for approximately 13 minutes. During the 13-minute roasting process, the coffee beans produced the first crack. However, the roasting process was ended before the coffee beans produced the second crack.

The coffee beans were then removed from the roasting equipment and allowed to cool overnight. Next, the cooled coffee beans were placed in a food-grade tumbler, typical of equipment used for flavored coffee preparation.

A solution containing fortifying agents was then prepared comprising the fortifying agents outlined below in Table Eight.

TABLE EIGHT

| The "Calcium" Solution (one gallon) | |
| --- | --- |
| triple deionized water | 1000.0 g |
| betaine | 13.0 g |
| calcium | 168.0 g |
| custom flavoring | 4.7 g |
| citric acid | qs to pH of 3.5 |

Specifically, the solution containing fortifying agents was made by placing the DIW into a clean 5-gallon MV. The MV was then placed on a warming griddle, and the temperature of the griddle was set to 325° F. Next, a mixer was placed in the MV and the speed was set to 350 rpm to ensure uniform heating.

Once the mixture reached 120° F., the griddle was turned off and the mixer speed increased to 500 rpm. Once the mixer was at 500 rpm, the calcium was added to the DIW and mixed for approximately 20 minutes.

The solution was then removed from the griddle, and once the temperature of the mixture reached 105° F., the pH of the solution was adjusted to about 3.5 with citric acid.

After a uniform solution was achieved, and the temperature decreased to below 95° F., betaine and custom flavoring were added to the solution and mixed for approximately 10 minutes. The speed of the mixer was then reduced to 400 rpm, and the mixing continued until the temperature reached approximately 90° F. The solution was then added to the coffee beans in the tumbler. The tumbler was started, and the solution and the coffee beans were mixed together for approximately 8 minutes. The beans were then removed from the tumbler. Finally, the coffee beans were packaged.

A 6 oz. cup of coffee brewed from the coffee beans infused with the calcium solution contains about 25 mg of calcium.

EXAMPLE SEVEN

Coffee beans have been infused with fortifying agents to help overall joint and bone health in the body.

Particularly, coffee beans were roasted for approximately 13 minutes. During the 13-minute roasting process, the coffee beans produced the first crack. However, the roasting process was ended before the coffee beans produced the second crack.

The coffee beans were then removed from the roasting equipment and allowed to cool overnight. Next, the cooled coffee beans were placed in a food-grade tumbler, typical of equipment used for flavored coffee preparation.

A solution containing fortifying agents was then prepared comprising the fortifying agents outlined below in Table Nine.

TABLE NINE

| The "Flex Boost" Solution (one gallon) | |
| --- | --- |
| triple deionized water | 3786.5 g |
| betaine | 94.7 g |
| calcium | 643.7 g |
| MSM | 651.3 g |
| custom flavoring | 259.4 g |
| citric acid | qs to pH of 3.5 |

Specifically, the solution containing fortifying agents was made by placing the DIW into a clean 5-gallon MV. The MV was then placed on a warming griddle, and the temperature of the griddle was set to 325° F. Next, a mixer was placed in the MV and the speed was set to 550 rpm to ensure uniform heating.

Once the DIW reached a temperature of 120° F., the griddle was turned off and the mixer increased to 650 rpm. MSM was then added and mixed with the DrW for approximately 10 minutes.

Next, calcium was added and the solution was mixed for about 20 minutes.

The solution was then removed from the griddle and the pH of the solution was adjusted to about 3.5 with citric acid.

After a uniform solution was achieved, and the temperature decreased to below 95° F., betaine and custom flavoring were added to the solution and mixed for approximately 10 minutes. The speed of the mixer was then reduced to 700 rpm, and the mixing continued until the temperature reached approximately 90° F. The solution was then added to the coffee beans in the tumbler. The tumbler was started, and the solution and the coffee beans were mixed together for approximately 8 minutes. The beans were then removed from the tumbler. Finally, the coffee beans were packaged.

A 6 oz. cup of coffee brewed from the coffee beans infused with the flex boost solution contains about 20 mg of calcium and about 20 mg of MSM.

Although the invention has been described with respect to specific embodiments and examples, it should be appreciated that other embodiments utilizing the concept of the present invention are possible without departing from the scope of the invention. The present invention is defined by the claimed elements, and any and all modifications, variations, or equivalents that fall within the true spirit and scope of the underlying principles.

What is claimed:

1. A method for fortifying a coffee bean comprising roasting a coffee bean until after first crack and infusing said coffee bean at a temperature of less than about 120° F. with a solution comprising water, a bridge initiator for acid salt bias, at least one fortifying agent, and an acid in a quantity sufficient to reach a pH of between about 4 to about 3.5.

2. The method of claim 1, wherein the solution comprises about 3500-4000 g of water, about 80-110 g of betaine, about 150-1500 g of at least one fortifying agent, and citric acid in a quantity sufficient to reach a pH of about 3.65 per gallon of solution.

3. The method of claim 1, wherein the at least one fortifying agent is a vitamin, non-vitamin, mineral, non-mineral, botanical, hormone, herb, neutraceutical, lipid, carbohydrate, amino acid, acid, salt, prebiotic, or probiotic.

4. A method for fortifying a coffee bean comprising the steps of roasting the coffee bean until after first crack, allowing the coffee bean to cool, and infusing the coffee bean at a temperature of less than about 120° F. with a solution comprising water, a bridge initiator for acid salt bias, at least one fortifying agent, and an acid in a quantity sufficient to reach a pH of between about 4 to about 3.5.

5. The method of claim 4, wherein the solution comprises about 3500-4000 g of water, about 80-110 g of betaine, about 150-1500 g of at least one fortifying agent, and citric acid in a quantity sufficient to reach a pH of about 3.65 per gallon of solution.

6. The method of claim 4, wherein the at least one fortifying agent is a vitamin, non-vitamin, mineral, non-mineral, botanical, hormone, herb, neutraceutical, lipid, carbohydrate, amino acid, acid, salt, prebiotic, or probiotic.

* * * * *